Patented Nov. 19, 1946

2,411,253

UNITED STATES PATENT OFFICE 2,411,253

PEST CONTROL

Albert L. Flenner and Norman E. Searle, Wilmington, Del., assignors to E. I. du Pont de Nemours & Company, Wilmington, Del., a corporation of Delaware No Drawing. Application October 11, 1941, Serial No. 414,608

9 Claims. (Cl. 167—22)

This invention relates to pest control and is particularly directed to methods and compositions for controlling and preventing or arresting the development and growth of pestiferous organisms such as insects and fungi which infest plant or animal matter either in the natural or fabricated state, and particularly to new insecticidal and fungicidal compositions and methods characterized in that the essential active agent is an acyclic alpha-alamino sulfide.

In the control of pestiferous organisms which commonly infest living plants, inorganic poisons and plant extractives are most commonly employed. Inorganic materials such as arsenicals, fluosilicates, sulfurs, coppers, and the like, while usually cheap and generally effective lack many desirable characteristics such as low toxicity to warm blooded animals, lack of foliage injury under certain conditions, and lack of high specific toxicity to certain types of organisms. Plant extractives while highly effective toward certain classes of pests are expensive and generally specific in their action. Except in a few isolated cases synthetic organic chemicals have not been found generally applicable to the problems involved. Similar problems evincing similar need for new synthetic organic toxicants for the control of insects and fungi occur with respect to those types of pestiferous organisms which commonly infest fabricated plant and animal matter such as wood, textiles, leather, furs, rope and similar materials. Thus there is a need for new synthetic organic pest-control agents which may be compounded as insecticides and fungicides for combatting the various problems in the art.

We have now discovered a new class of synthetic organic pest-control agents, many members of which may be synthesized readily from such cheap and available raw materials as amines, aldehydes, thiols, carbon disulfide and the like. This class is constituted by those organic compounds which have an aliphatic amino group (alamino group) linked through amino nitrogen to an alpha carbon atom of an organic sulfide and in which the N—C—S group is not part of a heterocyclic ring, or more simply the acyclic alpha-alamino sulfides.

The class may be represented by the formula

R—S—X—Y in which R is an organic radical attached to S through carbon, X is a methylene radical bearing at least one hydrogen, and Y represents an aliphatic substituted or unsubstituted amino radical linked through amino nitrogen to X. By preference R is a 2-thiazole radical, i. e., a thiazole as defined in U. S. Patent 2,961,840 to E. K. Bolton (page 1, lines 21-39) attached at the 2-position. Thus R may be the 2-benzothiazolyl or the 2-thiazolinyl radicals. In other important sub-groups R is alkyl or thiocarbamyl, and in each of the preferred cases X may be a methylene radical either unsubstituted or bearing one alkyl group and Y, the amino group, unsubstituted or substituted by aliphatic radicals.

The acyclic alpha-alamino sulfides may be conveniently prepared by reacting together a thiol compound, an aliphatic aldehyde, and a primary or secondary aliphatic amine as illustrated by the following equation:

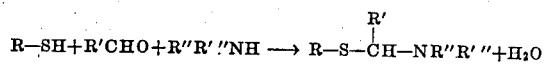

The reaction preferably may be carried out in the presence of a solvent such as one of the lower alcohols. In some cases the thiol compound and aldehyde are reacted together first to form the methylol sulfide followed by condensation with the amine, which occurs with the splitting out of water. In other cases the aldehyde may be reacted with the amine to form initially the methylol amine, which may then be reacted with the thiol compound. In most cases it is necessary merely to mix together equimolecular proportions of all three reactants in a suitable solvent and allow the reaction to take place at room temperature or at suitable elevated temperatures. The products are often crystalline solids that may be easily purified by recrystallization. Examples of the preparation and utilization of acyclic alpha-alamino sulfides in pest control compositions are given below.

EXAMPLE 1

2-BENZOTHIAZOLYL N-PIPERIDYLMETHYL SULFIDE

This compound may be obtained according to the following reaction:

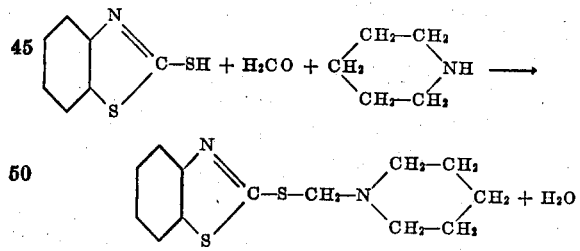

A mixture of 13 parts of 2-mercaptobenzothiazole, 6.5 parts of piperidine, and 10 parts of 37% aqueous formaldehyde in ethyl alcohol as a solvent is allowed to stand overnight. The product that separates is crystallized from ethyl alcohol after which it consists of yellow crystals melting at 114-6° C. This product contains by analysis 10.46% nitrogen and 24.79% sulfur.

A water-dispersible pest-control composition may be prepared by milling 80 parts of 2-benzothiazolyl N-piperidylmethyl sulfide with 20 parts of Bancroft clay. When applied as a 1:200 aqueous spray this composition acts as a repellent for Mexican bean beetles and Japanese beetles. The usefulness of this aminomethyl sulfide as a fungicide and preservative is illustrated by the data of Table I.

EXAMPLE 2

2-Benzothiazolyl Methylenaminomethyl Sulfide

This compound is prepared according to the following equation.

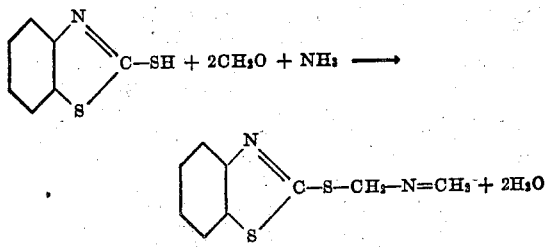

One process for preparing the desired aminomethyl sulfide is as follows: A mixture of 66.8 parts of 2-mercaptobenzothiazole, 240 parts of methanol, and 36 parts of 28% aqueous ammonia is stirred until a clear solution is obtained. With good stirring and sufficient cooling to maintain the temperature at 5-10° C., 100 parts of 37% aqueous formaldehyde diluted with 100 parts of water is slowly added. The precipitated aminomethyl sulfide is then washed with water, ammoniacal alcohol, and ether after which the product is dried in vacuo. A yield of 62 parts of light yellow powder melting with decomposition at about 100-120° C. is obtained. The sulfur content by analysis is 32.0%.

2-benzothiazolyl methylenaminomethyl sulfide is an effective fungicide and preservative as indicated by the data of Table I.

EXAMPLE 3

Dimethylaminomethyl Dimethyldithiocarbamate

This aminomethyl sulfide is of the thioester type and may readily be obtained as follows:

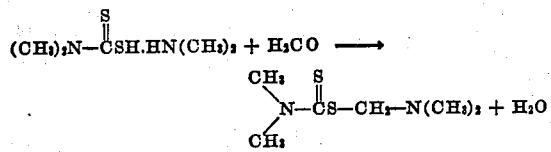

To a solution of 90 parts of dimethylammonium dimethyldithiocarbamate in 90 parts of water, 45 parts of 37% aqueous formaldehyde solution is slowly added with good stirring and sufficient cooling to maintain the temperature at 0° C. The product immediately precipitates as a white crystalline material, which is filtered off, washed with ice water, and air dried. The crude product amounts to 73.6 parts of white crystals melting at 35-37° C. After recrystallizing from ether, the melting-point is raised to 38-9° C. The product contains by analysis 35.64% sulfur and is soluble in all the common organic solvents including the hydrocarbon oils.

Dimethylaminomethyl dimethyldithiocarbamate may be prepared for pesticidal applications by grinding one part of the active ingredient together with 2 parts of bentonite. When this composition was made into an aqueous dispersion of ½% concentration and sprayed onto bean plants very little feeding by Mexican bean beetle adults was observed while 80% of the insects were destroyed. This performance is equal to that given by the lead arsenate control.

EXAMPLE 4

2-Benzothiazolyl N-Morpholinomethyl Sulfide

A mixture of 33.4 parts of 2-mercaptobenzothiazole, 160 parts of methanol, and 16.2 parts of 37% aqueous formaldehyde is warmed until a clear solution is obtained. Then 17.4 parts of morpholine is added and the solution boiled for 10 minutes. On cooling 46 parts of a yellow crystalline solid separates. After recrystallization from carbon tetrachloride this aminomethyl sulfide melts at 148-150° C. and contains by analysis 10.44% nitrogen.

2-benzothiazolyl N-morpholinomethyl sulfide is an effective insectifuge for protecting bean plants from Mexican bean beetles. A suitable dust for this application is prepared by mixing 1 part of the aminomethyl sulfide dissolved in a convenient amount of acetone with 99 parts of talc and evaporating the pasty mass to dryness, after which the composition is comminuted by ball milling. Although this composition was not appreciably lethal to the Mexican bean beetle larvae it was at least 90% effective in preventing feeding.

EXAMPLE 5

Dodecylaminomethyl 2-Thiazolinyl Sulfide

This compound is obtained upon adding a solution 27.8 parts of dodecylamine in 20 parts of methanol to a hot solution of 17.9 parts of 2-mercapto-2-thiazoline and 12.2 parts of 37 per cent aqueous formaldehyde in 60 parts of methanol. The oily mixture which precipitates is heated at the boil with stirring for ten minutes, cooled, and filtered. The residue amounting to 42 parts consists of soft, waxy crystals melting at 39-42° C. containing 8.69 per cent nitrogen by analysis.

A dust suitable for insecticidal applications may be prepared by mixing one part of dodecylaminomethyl 2-thiazolinyl sulfide with 99 parts of talc in the presence of sufficient acetone to make a smooth uniform paste. Upon drying the caked mass is ground into a fine powder comprising the active constituent coated onto the talc. Used to control Mexican bean beetle larvae on bean plants, this dust gave a 93% kill and allowed 5% foliage consumption under rigorous laboratory conditions. In direct comparison a 1% calcium arsenate dust made up with talc gave 80% kill and allowed 5% foliage to be eaten.

Dispersions of dodecylaminomethyl 2-thiazolinyl sulfide in water show aphicidal activity. Such a dispersion may be prepared by diluting 1 part of a solution containing 2.5% of the thiazolinyl sulfide and 0.25% of the sodium salt of sulfated technical oleyl acetate, prepared as described in Example I of U. S. Patent 2,163,133 in acetone with 24 parts of water. Sprayed on a mixed culture of *Aphis rumicis* and *Myzus persicae* on nasturtium plants, this solution effected an 87% kill of the former and a 93% kill of the latter. Practically no kill is obtained with a similar composition in which the thiazolinyl sulfide is omitted.

The effectiveness of dodecylaminomethyl 2-thiazolinyl sulfide as a fungicide and preservative may be noted from the data of Table I.

EXAMPLE 6

4-MORPHOLINOMETHYL 2-THIAZOLINYL SULFIDE

This compound is obtained as follows: A mixture containing 23.8 parts of 2-mercapto-2-thiazoline and 16.2 parts of 37% aqueous formaldehyde in 80 parts of methanol is warmed with stirring until solution is effected. Then 17.4 parts of morpholine is slowly added with caution since considerable heat is evolved. When the reaction subsides, the mixture is heated at the boil for 5 minutes. Upon cooling the product separates as white crystals, which are filtered off and recrystallized from methanol. The yield is 36 parts of recrystallized product melting at 111–3° C. and containing by analysis 29.66% sulfur (the theoretical value is 29.36%).

An insecticidal dust is prepared by grinding together 80 parts of 4-morpholinomethyl 2-thiazolinyl sulfide, 14 parts of tricalcium phosphate, 5 parts of bentonite, and 1 part of "Lorol" alcohol. This water-dispersible powder may be used in aqueous sprays or dusts. When diluted with talc so as to yield an active ingredient concentration of 0.5% and applied to bean plants infested with Mexican bean beetle larvae, 93% of the insects were destroyed while only 5% of the foliage was consumed. The calcium arsenate control at the same concentration allowed approximately the same proportion of foliage to be consumed while effecting a kill of 73%.

This alpha-alamino sulfide may be formulated into mothproofing compositions of unusual effectiveness. In tests in which standard woolen test fabric was impregnated from 2% solution in acetone and then dried and exposed to attack by vigorous moth larvae for two weeks 100% of the moth larvae were destroyed while only 1% or less of the surface nap was visibly damaged. Under the same conditions the untreated check was damaged to the extent of 56%.

EXAMPLE 7

DICYCLOHEXYLAMINOMETHYL 2-THIAZOLINYL SULFIDE

This compound is obtained upon adding 27.2 parts of dicyclohexylamine to a warm solution of 17.9 parts of 2-mercapto-2-thiazoline and 12 parts of 37 per cent aqueous formaldehyde in 80 parts of methanol. The solution is brought to a boil and then cooled to throw down the white crystalline product (90 per cent of theory). It consists of colorless needles melting at 109–111° C. and contains 20.35 per cent sulfur by analysis.

A composition suitable for dispersing in water is prepared by milling together 80 parts of dicyclohexylaminomethyl 2-thiazolinyl sulfide, 14 parts of tricalcium phosphate, 5 parts of bentonite, and 1 part of "Lorol" alcohol. When sprayed on apples at an active ingredient concentration of 4 lbs./100 gallon, 87.5% control of codling moth was obtained, whereas under the same conditions lead arsenate gave 50% control.

This alpha-alamino sulfide may be formulated into mothproofing compositions of unusual effectiveness. In tests in which standard woolen test fabric was impregnated from 2% solution in acetone and then dried and exposed to attack by vigorous moth larvae for two weeks 100% of the moth larvae were destroyed while only 1% or less of the surface nap was visibly damaged. Under the same conditions the untreated check was damaged to the extent of 73%.

The acyclic alpha-alamino sulfides of this invention exhibit unusual utility as fungicides and preservatives. The data of Table I are illustrative. These data were obtained by making a dispersion of the fungicide in sterile liquid malt agar (pH of 5.7) followed, after hardening, by inoculation with a suspension of the appropriate fungus organism.

Table I

| Acyclic aminomethyl sulfide | Concentration effective against | |
|---|---|---|
| | Penicillium lumber mold | *Aspergillus niger* |
| Benzothiazolyl piperidylmethyl sulfide | 1:4,000 | 1:8,000 |
| Benzothiazolyl methylenaminomethyl sulfide | 1:1,000 | 1:1,000 |
| Dimethylaminomethyl dimethyldithiocarbamate | 1:8,000 | 1:4,000 |
| Benzothiazolyl N-morpholinomethyl sulfide | 1:4,000 | 1:4,000 |
| Benzothiazolyl dicyclohexylaminomethyl sulfide | 1:4,000 | 1:4,000 |
| Dodecylaminomethyl 2-thiazolinyl sulfide | 1:4,000 | 1:4,000 |
| beta-Hydroxyethylaminomethyl propyl sulfide | 1:1,000 | 1:1,000 |
| N-morpholinomethyl oxydiethylenedithiocarbamate | 1:1,000 | 1:1,000 |
| N-morpholinomethyl 2-thiazolinyl sulfide | 1:250 | 1:1,000 |
| Dicyclohexylaminomethyl 2-thiazolinyl sulfide | 1:250 | 1:250 |
| Piperidylmethyl 2-thiazolinyl sulfide | 1:250 | 1:250 |

The foregoing are representative of various methods and compositions. It is to be understood, however, that the invention is in no wise limited thereto and that the active agents may be made by other methods, may be compounded in other ways and applied for the control of other types of insects, pests and microorganisms. By means of methods analogous to those described above, a wide variety of products may be obtained in which R in the general formula R—S—X—Y, in addition to benzothiazolyl, thiazolinyl, alkyl, and thiocarbamyl as already described, may be aryl, such as phenyl, tolyl, naphthyl, and their common halogen and nitro substitution products; aralkyl, such as benzyl; cycloalkyl, such as cyclohexyl; alkenyl, such as allyl, crotyl, cyclohexenyl; straight or branched aliphatic chains of from 1 to 24 carbon atoms and their halogen and nitro substitution products, such as methyl, amyl, 2-ethylhexyl, dodecyl; acyl, such as benzoyl or acetyl; and thioacyl, such thioacetyl or thiobenzoyl. Bifunctional acyclic alpha-alamino sulfides such as would exist if R were bifunctional as, for example, Y—X—S—CH$_2$CH$_2$—S—X—Y, are included. The X group may vary also according to the nature of the aldehyde and may include the substitution of one methylene hydrogen as by a lower alkyl group, such as methyl, ethyl, propyl, isopropyl, and the like. Thus X may be ethylidene, propylidene, and isobutylidene. The alamino radical may be either unsubstituted or substituted by aliphatic substituents. Suitable substituted alamino groups include methylamino, diethylamino, hexamethylenimino, dioctylamino, betahydroxyethylamino, and the like. Y may also be alamido, though it appears generally that compounds of this type are relatively inferior. Thus, the alamido sulfides, N-(2-benzothiazolylthiomethyl)-epsilon-caprolactam, N-(2-benzothiazolylthiomethyl)-caprylamide, N-(ethylthiomethyl)-epsilon-caprolactam, and N-(ethylthiomethyl) lauramide show only mild toxicity as compared with the alamino sulfides.

The parasiticidal agents of this invention may be used as fungicides, insecticides, insectifuges, foliage protectants, mothproofing agents, aphicides, and as the toxic ingredients in baits. They are particularly useful for protecting textile materials from the ravages of clothes moths and carpet beetles, and for protecting growing plants and foliage from depredatory insects such as the Mexican bean beetle, the Colorado potato beetle, the Japanese beetle, and the like. The agents of this invention may be used to prevent bacterial and fungous decay and putrefaction of such materials as rawhides, glues, gelatins, carbohydrate pastes, rope, lumber, fabrics, and other materials, either natural or manufactured, that are subject to attack and decomposition by microorganisms. These products may also be used for the control of mildew and other fungous diseases to which living plants are subject.

They may be used in various combinations with such auxiliary materials as spreaders, stickers, and other toxicants; for example, insecticides such as metallic arsenates, fluosilicates, phenothiazines, organic thiocyanates such as n-dodecyl thiocyananate and butyl carbitol thiocyanate, nicotine, anabasine (neo-nicotine) nor-nicotine, rotenone and its congeners, hellebore, pyrethrum, N-isobutylundecylenamide, aminomethyl sulfides, and bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quaternary ammonium halides and derivatives of dithiocarbamic acid such as ferric dimethyldithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, kaolin, diatomaceous earth, sulfur, lime, pyrophyllite, talc, bentonite, flours such as walnut shell, wheat, redwood, soya bean, cottonseed, or with organic solvents such as trichloroethylene, tetrachloroethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures as are here set out may have particular usefulness in special applications and frequently will give better results than would be anticipated from the killing power or repellent action of each ingredient when used alone.

Thus the active agents of this invention may be formulated in a wide variety of ways as may be best suited to the control of any particular pest or combination of pests having in mind the nature of the pests, their particular habitat and feeding habits and their peculiar susceptibilities, if any. Thus suitable compositions may be prepared with the active agent in a state of composition, subdivision, association with such other materials as have been mentioned, etc., such as may be necessary peculiarly to adapt the active agent to the purpose to be effected.

We claim:

1. A parasiticidal composition containing as an essential active ingredient the compound having the formula R—S—X—Y in which R is a thiazole attached at the 2-position, X is a methylene radical bearing at least one hydrogen and Y represents an aliphatic substituted or unsubstituted amino radical linked through amino nitrogen to X, and a carrier therefor.

2. A parasiticidal composition containing as an essential active ingredient a 2-benzothiazolyl alpha-alamino methyl sulfide and a carrier therefor.

3. A process for protecting material from attack by insects and pestiferous micro-organisms which comprises treating the material with a compound having the formula R—S—X—Y in which R is a thiazole attached at the 2-position, X is a methylene radical bearing at least 1 hydrogen, and Y represents an aliphatic substituted or unsubstituted amyl radical linked through amino nitrogen to X.

4. A process for protecting material from attack by insects and pestiferous micro-organisms which comprises treating the material with a 2-benzothiazolyl alpha-alamino methyl sulfide.

5. A parasiticidal composition containing as an essential active ingredient an acyclic alpha-alamino sulfide and a carrier therefor.

6. A process for protecting material from attack by insects and pestiferous micro-organisms which comprises treating the material with an acyclic alpha-alamino sulfide.

7. A parasiticidal composition containing as an essential active ingredient 2-benzothiazolyl N-piperidylmethyl sulfide and a carrier therefor.

8. A parasiticidal composition containing as an essential active ingredient dimethylaminomethyl dimethyldithiocarbamate and a carrier therefor.

9. A parasiticidal composition containing as an essential active ingredient dodecylaminomethyl 2-thiazolinyl sulfide and a carrier therefor.

ALBERT L. FLENNER.
NORMAN E. SEARLE.